United States Patent
Wang

(10) Patent No.: US 12,152,728 B2
(45) Date of Patent: Nov. 26, 2024

(54) CARBON-FIBRE COMPOSITE HIGH-PRESSURE HYDROGEN STORAGE TANK AND MANUFACTURING PROCESS THEREOF

(71) Applicant: Mengjun Wang, Xiamen (CN)

(72) Inventor: Mengjun Wang, Xiamen (CN)

( * ) Notice: Subject to any disclaimer, the term of this patent is extended or adjusted under 35 U.S.C. 154(b) by 82 days.

(21) Appl. No.: 17/993,947

(22) Filed: Nov. 24, 2022

(65) Prior Publication Data
US 2023/0092930 A1 Mar. 23, 2023

Related U.S. Application Data

(63) Continuation of application No. PCT/CN2021/109584, filed on Jul. 30, 2021.

(30) Foreign Application Priority Data

Jul. 8, 2021 (CN) .......................... 202110772907.X

(51) Int. Cl.
*F17C 1/02* (2006.01)
*B32B 1/00* (2024.01)
(Continued)

(52) U.S. Cl.
CPC .................. *F17C 1/02* (2013.01); *B32B 1/00* (2013.01); *B32B 5/02* (2013.01); *B32B 7/12* (2013.01); *B32B 2262/106* (2013.01); *B32B 2439/40* (2013.01); *F17C 2201/0109* (2013.01); *F17C 2203/013* (2013.01);
(Continued)

(58) Field of Classification Search
CPC ...... F17C 1/06; F17C 1/04; F17C 1/02; F17C 2203/0663; F17C 2203/013; F17C 2203/011; F17C 2203/0619; F17C 2203/0621; F17C 2203/0614; F17C 2209/2154; F17C 2260/011;
(Continued)

(56) References Cited

U.S. PATENT DOCUMENTS

| | | | | |
|---|---|---|---|---|
| 1,651,521 A | * | 12/1927 | Lucas-Girardville | F17C 1/06 220/651 |
| 3,557,827 A | * | 1/1971 | Marsh | B01J 47/022 220/62.19 |

(Continued)

FOREIGN PATENT DOCUMENTS

| | | | |
|---|---|---|---|
| CN | 1918423 A | 2/2007 | |
| CN | 112743878 A | 5/2021 | |
| CN | 112762356 A | 5/2021 | |
| CN | 113028271 A | 6/2021 | |
| DE | 102004003319 A1 * | 8/2004 | ............... F17C 1/00 |
| JP | H07243588 A | 9/1995 | |

*Primary Examiner* — Robert J Hicks
(74) *Attorney, Agent, or Firm* — Birchwood IP

(57) ABSTRACT

A carbon-fibre composite high-pressure hydrogen storage tank and a manufacturing process thereof are provided. The hydrogen storage tank includes a tank body, where a gas guide port is formed in one side of the tank body, a reinforcing member for improving the strength of the tank body is arranged in an inner cavity of the tank body, a side end of the reinforcing member is fixedly connected to an inner wall of the tank body, and the tank body and the reinforcing member are all made of the carbon-fibre composite. The whole strength and rigidity of the hydrogen storage tank can be improved and safer and more reliable hydrogen storage tank under a high pressure can be ensured.

14 Claims, 8 Drawing Sheets

(51) Int. Cl.
*B32B 5/02* (2006.01)
*B32B 7/12* (2006.01)

(52) U.S. Cl.
CPC ............. *F17C 2203/0619* (2013.01); *F17C 2203/0663* (2013.01); *F17C 2209/2154* (2013.01); *F17C 2209/232* (2013.01); *F17C 2221/012* (2013.01); *F17C 2260/011* (2013.01)

(58) Field of Classification Search
CPC ..... F17C 2201/0109; F17C 2201/0104; B32B 5/02; B32B 7/12; B32B 7/04; B32B 2262/106
USPC ....... 220/589, 588, 587, 586, 62.19; 206/0.6
See application file for complete search history.

(56) References Cited

U.S. PATENT DOCUMENTS

| | | | |
|---|---|---|---|
| 5,518,140 A * | 5/1996 | Lenz | F17C 9/00 220/585 |
| 2009/0152278 A1* | 6/2009 | Lindner | F17C 1/00 220/586 |
| 2009/0308874 A1* | 12/2009 | Lindner | F17C 1/16 220/591 |
| 2011/0210127 A1* | 9/2011 | Strack | F16J 12/00 220/586 |
| 2012/0037641 A1* | 2/2012 | Bruce | F17C 13/002 220/589 |
| 2012/0048865 A1* | 3/2012 | Eihusen | F17C 13/002 220/586 |

* cited by examiner

CARBON-FIBRE COMPOSITE HIGH-PRESSURE HYDROGEN STORAGE TANK AND MANUFACTURING PROCESS THEREOF

CROSS-REFERENCE TO RELATED APPLICATIONS

This application is a continuation of co-pending International Patent Application No. PCT/CN2021/109584, filed on Jul. 30, 2021, which claims the priority and benefit of Chinese patent application number 202110772907.X, filed Jul. 8, 2021 with China National Intellectual Property Administration, the entire contents of which are incorporated herein by reference.

TECHNICAL FIELD

The present disclosure relates to the technical field of hydrogen energy, in particular to a carbon-fibre composite high-pressure hydrogen storage tank and a manufacturing process thereof.

BACKGROUND

The hydrogen storage is one of the key links in the hydrogen energy application. In order to store hydrogen effectively and stably, more hydrogen must be stored in the same storage space, that is, the hydrogen is stored at a high density, and the stability and safety during the storage process must be ensured.

The existing hydrogen storage tank is mainly divided into four types: a pure steel metal bottle (type-I), a steel liner fibre winding bottle (type-II), an aluminum liner fibre winding bottle (type-III) and a plastic liner fibre winding bottle (type-IV). Due to low hydrogen storage density and poor safety performance, the type-I bottle and the type-II bottle are hard to meet the requirement of the vehicle-mounted hydrogen storage density. With the advantages of improving safety, reducing weight and improving the mass hydrogen storage density, the type-III bottle and the type-IV bottle are widely applied, the type-IV bottle is mostly applied in foreign countries, and the type-III bottle is mostly applied in our country. Compared with the type-III bottle, the type-IV bottle has become a "new favorite" leading the development direction of high-pressure hydrogen storage containers for international hydrogen energy automobiles by virtue of its excellent hydrogen embrittlement corrosion resistance, lighter mass, lower cost and higher mass hydrogen storage density and cycle life. However, the type-IV bottle also has many problems, such as how to seal its plastic liner and metal bottleneck, and whether the plastic liner can meet the using requirements within the whole life cycle of the bottle.

Now, a carbon-fibre composite high-pressure hydrogen storage tank is provided, with high strength and light mass; and it has the problem of combining different materials compared with the traditional hydrogen storage tank, and its tank is all made of carbon-fibre composite, so it processes better interlayer bonding and sealing performance.

SUMMARY

The purpose of the present disclosure is to provide a carbon-fibre composite high-pressure hydrogen storage tank and a manufacturing process thereof, a reinforcing member for connecting and supporting two ends of an inner wall of a tank body is arranged in an inner cavity of the tank body, a reinforcing ring is arranged on the inner wall of the tank body along a circumferential direction, so as to improve the whole strength and rigidity of the hydrogen storage tank and ensure the safer and more reliable hydrogen storage tank under a high pressure.

In order to implement the above purpose, the present disclosure adopts the technical solution below:

a carbon-fibre composite high-pressure hydrogen storage tank, including a tank body, wherein a gas guide port is formed in one side of the tank body, a reinforcing member for improving the strength of the tank body is arranged in an inner cavity of the tank body, a side end of the reinforcing member is fixedly connected to an inner wall of the tank body, and the tank body and the reinforcing member are all made of carbon-fibre composite.

Preferably, the reinforcing member includes a plurality of reinforcing plates, which are cooperated with each other and integrally formed with the tank body.

Preferably, four reinforcing plates are provided, and a cross section of the reinforcing member is cross-shaped.

Preferably, a bottom end of the reinforcing member extends to the bottom of the inner wall of the tank body.

Preferably, the tank body includes a preforming layer and an outer winding layer covered on an outer surface of the preforming layer.

Preferably, the preforming layer includes a first preforming layer and a second preforming layer, the second preforming layer is adhered to an inner surface of the outer winding layer, an end part of the reinforcing member is fixedly connected to the second preforming layer so that the inner cavity of the tank body is divided into a plurality of cavities, and the first preforming layer adhered to the second preforming layer and the reinforcing member is arranged in the cavities.

Preferably, a plurality of reinforcing rings are arranged on the inner wall of the tank body along a circumferential direction.

Preferably, a metal gas guide tube is embedded at a position where the tank body is located at the gas guide port.

Preferably, a sealing pad is filled between the metal gas guide tube at a corner and the tank body.

Preferably, a plurality of depression portions are arranged at a position where an outer side of the metal gas guide tube is located at a front end of the corner, and protrusion portions corresponding to the depression portions are arranged on the inner wall of the tank body.

A manufacturing process for a carbon-fibre composite high-pressure hydrogen storage tank, including the following steps of:

S1: processing and curing a reinforcing member for improving the strength of a tank body, and forming a plurality of cavity preforming grooves on the reinforcing member;

S2: filling high-pressure air in a silicon air pocket and maintaining the pressure continuously, so that the silicon air pocket expands and its surface is subjected to the primary yarn covering by adopting the carbon-fibre composite to form a first preforming layer, thereby manufacturing cavity preforming members of the tank body;

S3: combining and preforming a plurality of cavity preforming members manufactured in S2 to cavity preforming grooves of the reinforcing member in S1, so as to form tank body preforming members;

S4: performing a secondary yarn covering on the surfaces of the tank body preforming members manufactured in S3 by adopting the carbon-fibre composite, so as to form a second preforming layer; and embedding a metal gas guide tube at a gas guide port of the tank body preforming member and between the first performing layer and the second preforming layer;

S5: cooling the tank body preforming member with the secondary yarn covering in S4 to a room temperature after being baked and cured, winding a surface of the second preforming layer by adopting the carbon-fibre composite so as to form an outer winding layer, and the outer winding layer extending to an outer surface of the metal gas guide tube; and S6: cooling the tank body preforming members wound in S5 to a room temperature after being baked and cured, releasing the gas in the silicon air pocket and taking out the silicon air pocket, and trimming and processing the prepared tank body.

Preferably, in S2, the silicon air pocket is transversely provided with a groove on an outer surface of each cavity preforming member, and the first preforming layer extends in the groove to form a reinforcing ring.

Preferably, in S4, a sealing pad is filled between the metal gas guide tube at the corner and the second preforming layer.

Preferably, in S5, a plurality of depression portions are arranged at a position where the metal gas guide tube is located at a front end of the corner, and protrusion portions corresponding to the depression portions are arranged on the inner wall of the outer winding layer.

After adopting the above technical solution, compared with the background art, the present disclosure has the following advantages:

1. According to the carbon-fibre composite high-pressure hydrogen storage tank and the manufacturing process thereof provided by the present disclosure, the hydrogen storage tank adopts a multi-process co-curing molding technology with inner layer hollow blowing and outer layer winding, so that the fibre of the inner layer and the outer layer is dense and smooth, and the product strength is improved; the reinforcing member for connecting and supporting two ends of the inner wall of the tank body is arranged in the inner cavity of the tank body, the reinforcing ring is arranged on the inner wall of the tank body along the circumferential direction, so as to further improve the whole strength and rigidity of the hydrogen storage tank and ensure the safer and more reliable hydrogen storage tank under the high pressure.

2. According to the carbon-fibre composite high-pressure hydrogen storage tank and the manufacturing process thereof provided by the present disclosure, in addition to the metal gas guide tube, the hydrogen storage tank is all made of the high-end carbon-fibre composite, so as to solve the interlayer bonding problem among many kinds of different materials of the existing tank body, and the carbon-fibre composite has lighter mass, so as to further reduce the weight of the hydrogen storage tank for easy transportation.

3. According to the carbon-fibre composite high-pressure hydrogen storage tank and the manufacturing process thereof provided by the present disclosure, the sealing pad is filled between the metal gas guide tube at the corner and the tank body, the protrusion portions clamped into the depression portions on the metal gas guide tube are arranged on the outer winding layer, thereby enhancing the sealing performance of the tank body and the metal gas guide tube.

DETAILED DESCRIPTION

In order to make the objectives, technical solution and advantages of the present disclosure clearer and definer, the present disclosure will be described in detail below in conjunction with the drawings and the embodiments. It is understood that the specific embodiments described herein are merely used for explaining the present disclosure, instead of limiting the present disclosure.

In the present disclosure, it is noted that orientation or position relationships indicated by the terms "upper", "lower", "left", "right", "vertical", "horizontal", "inner", "outer" and the like are for ease of describing the present application and simplifying the description only, rather than indicating or implying that the apparatus or element of the present disclosure necessarily has a particular orientation. Therefore, these terms should not be understood as limitations to the present application.

Embodiment

Figure 1:
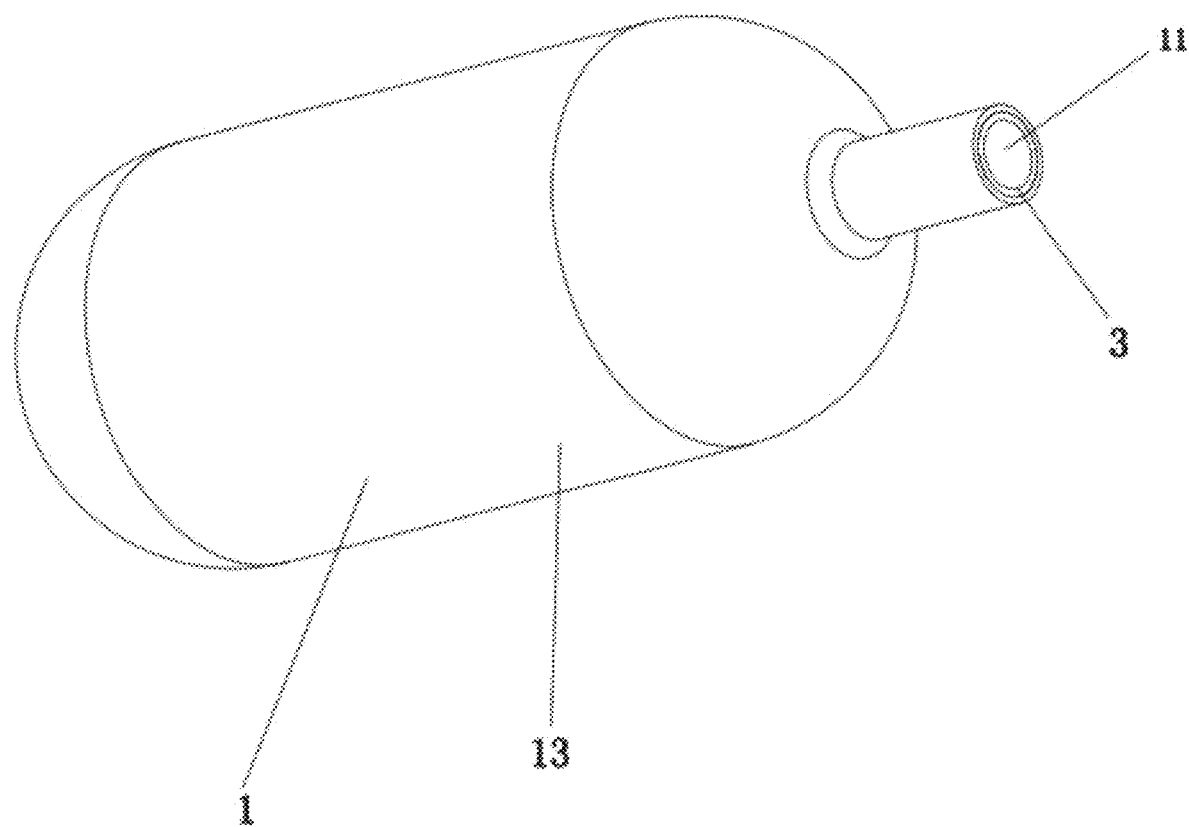
FIG. 1 is a structure schematic diagram of the present disclosure.
Figure 2:
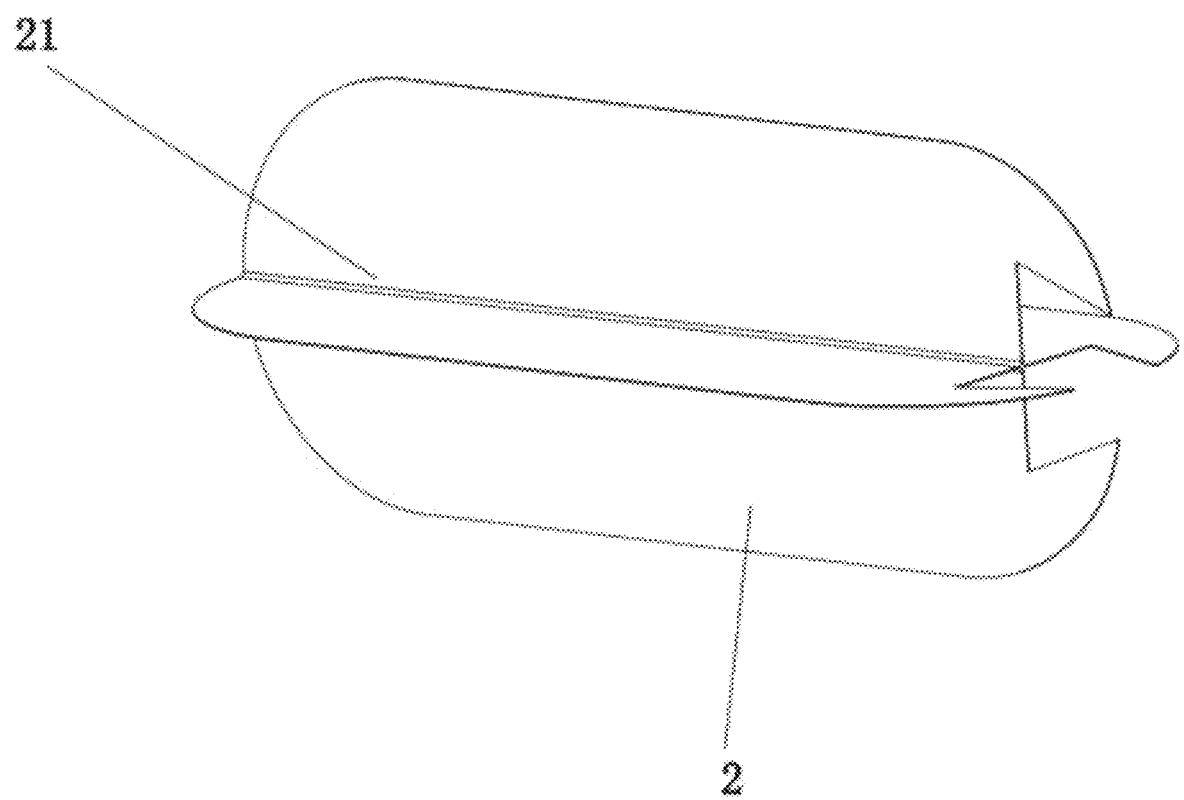
FIG. 2 is a structure schematic diagram of a reinforcing member of the present disclosure.
Figure 3:
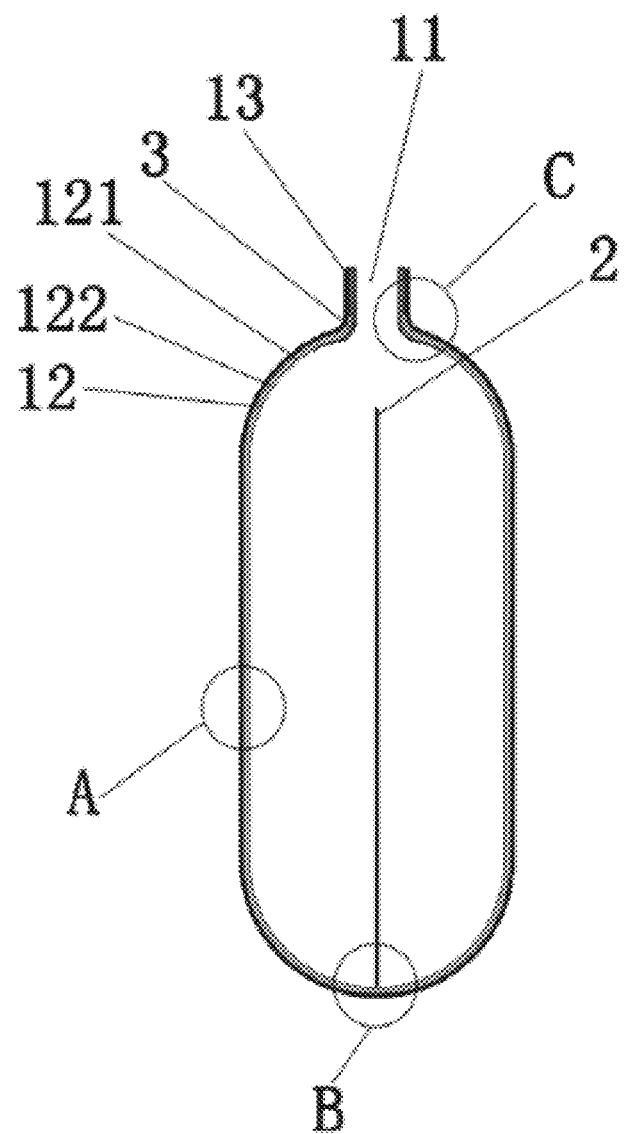
FIG. 3 is a longitudinal section view of the present disclosure.
Figure 4:
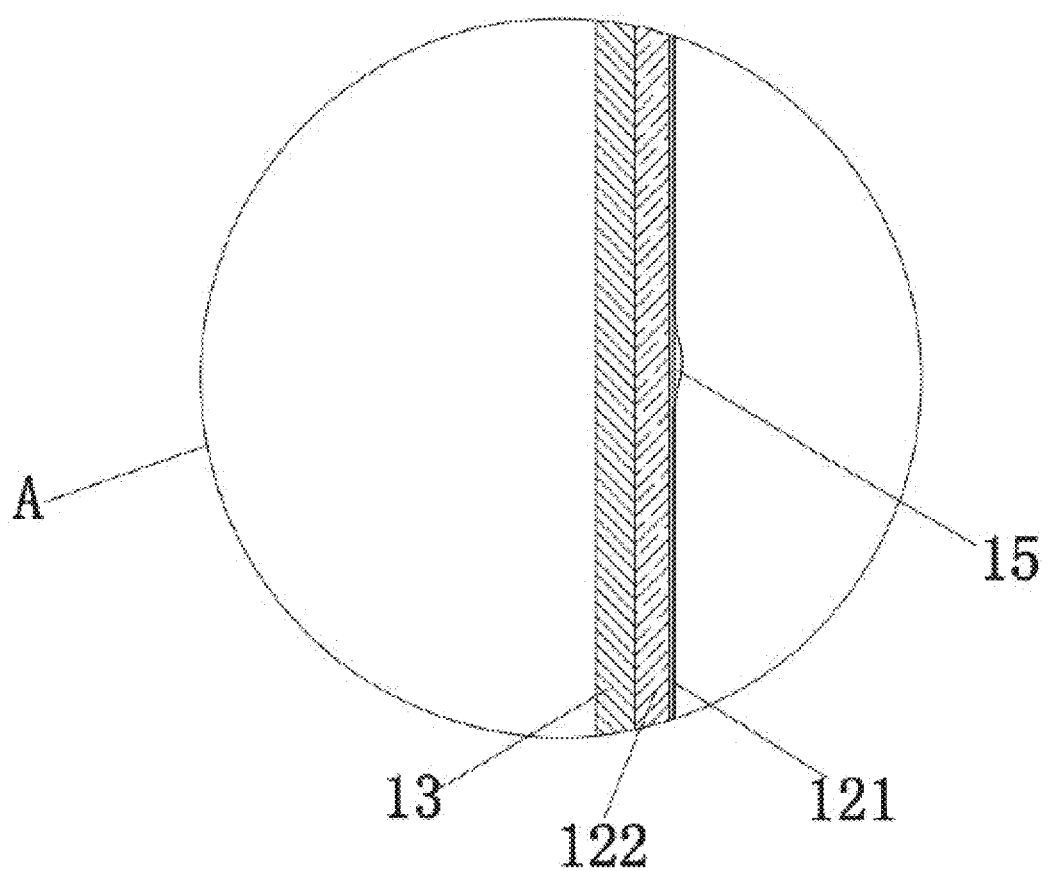
FIG. 4 is a local amplified diagram of A in FIG. 3 of the present disclosure.
Figure 5:
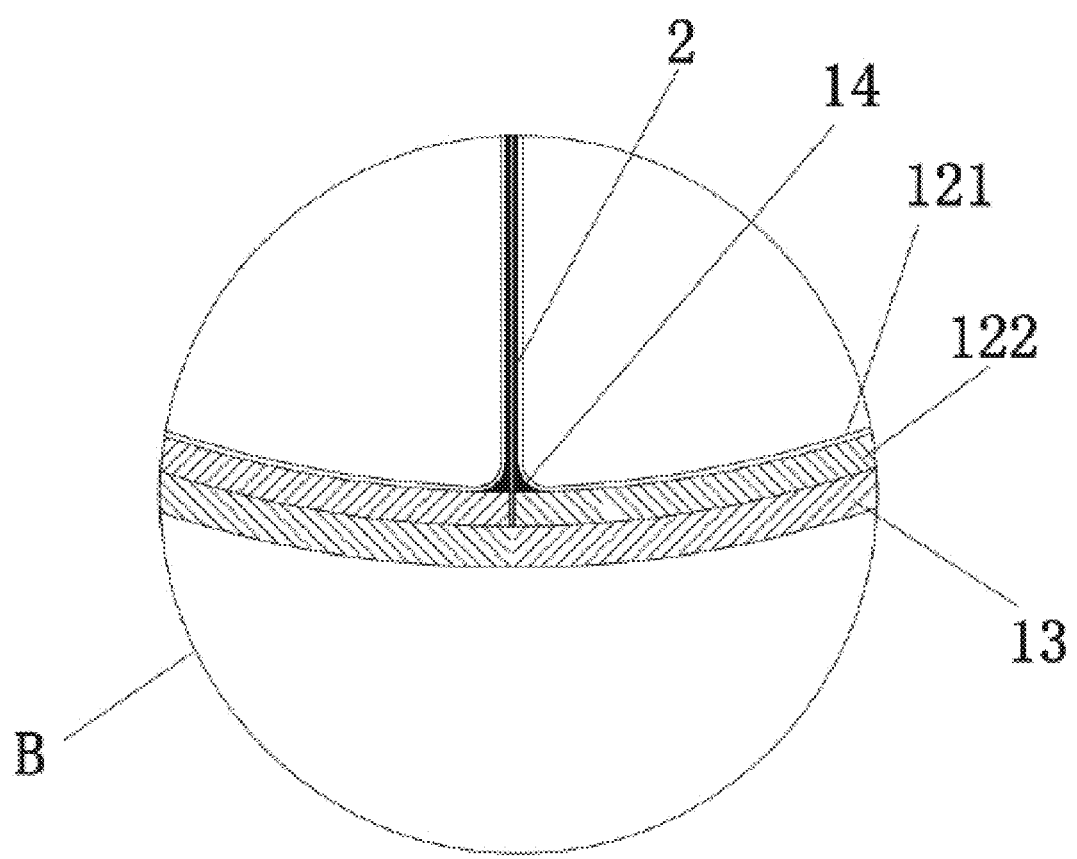
FIG. 5 is a local amplified diagram of B in FIG. 3 of the present disclosure.
Figure 6:
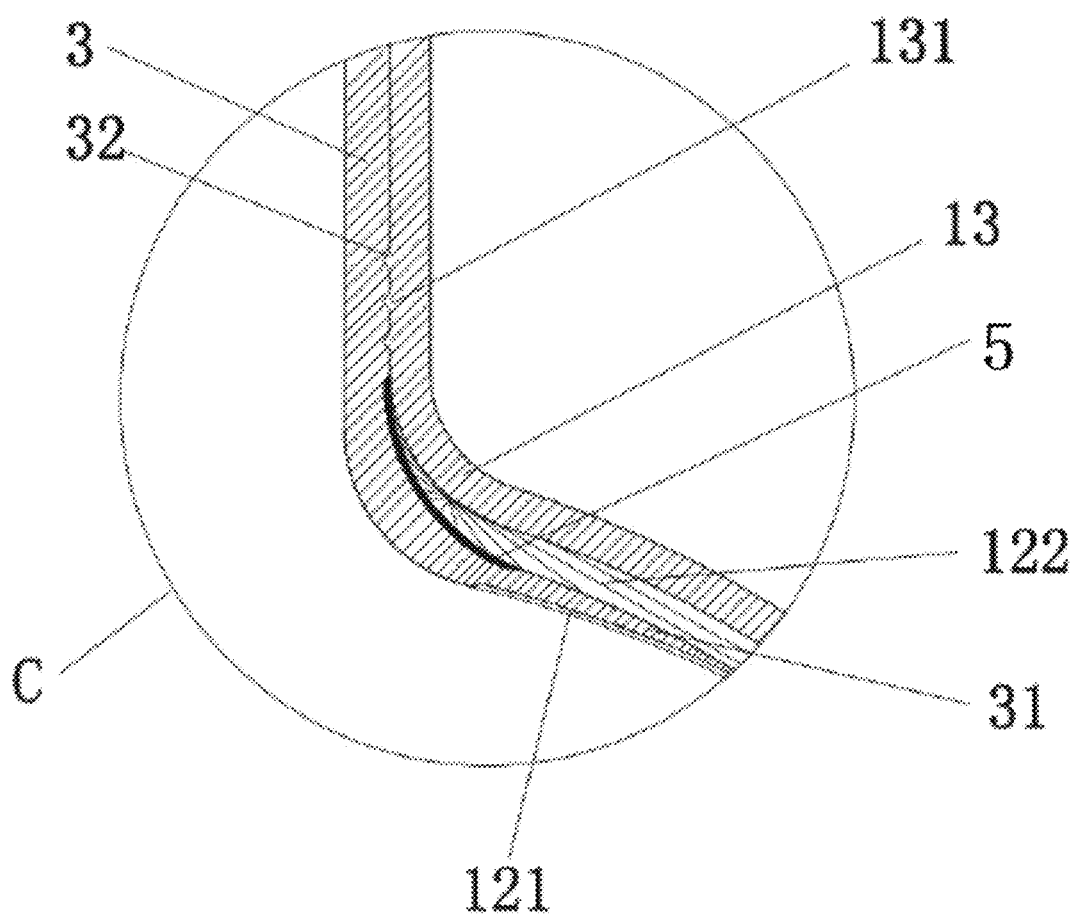
FIG. 6 is a local amplified diagram of C in FIG. 3 of the present disclosure.
Figure 7:
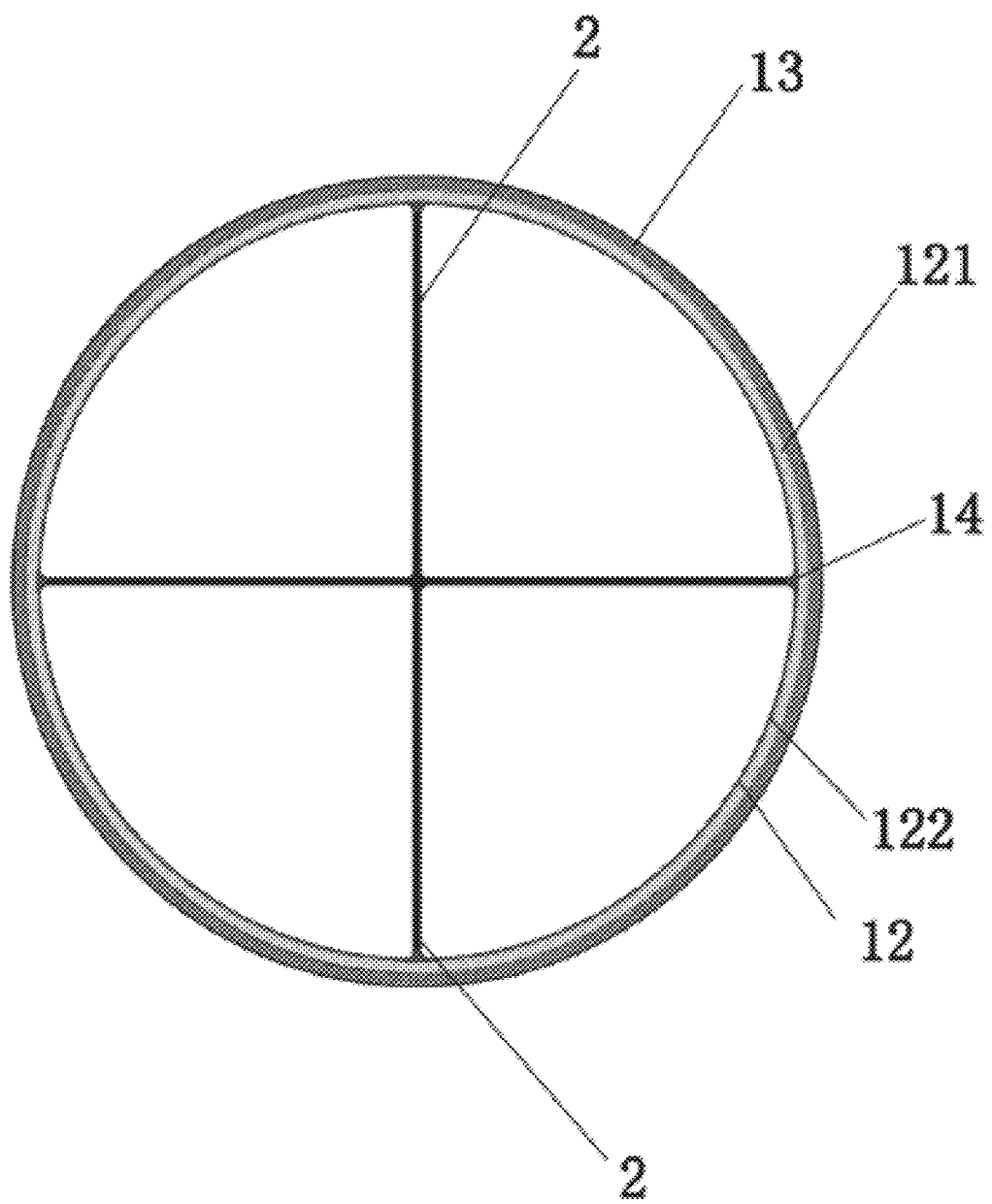
FIG. 7 is a horizontal section view of the present disclosure.
Figure 8:
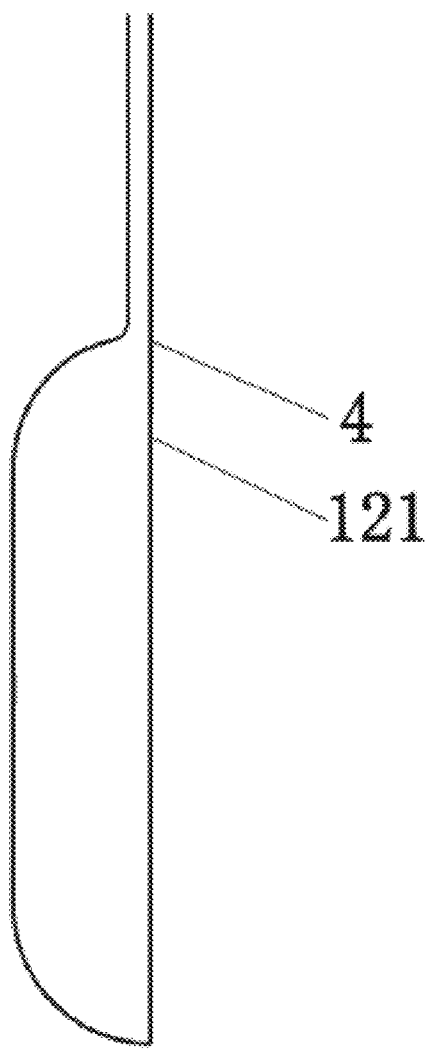
FIG. 8 is a structure schematic diagram of a silicon air pocket of the present disclosure.

Referring to FIG. 1 to FIG. 8, the present disclosure provides a carbon-fibre composite high-pressure hydrogen storage tank, including a tank body 1, wherein a gas guide port 11 is formed in one side of the tank body 1, a reinforcing member 2 for improving the strength of the tank body 1 is arranged in an inner cavity of the tank body 1, a side end of the reinforcing member 2 is fixedly connected to an inner wall of the tank body 1, and the tank body 1 and the reinforcing member 2 are all made of carbon-fibre composite.

The reinforcing member 2 includes a plurality of reinforcing plates, which are cooperated with each other and integrally formed with the tank body 1; an inner cavity of the tank body 1 is divided into a plurality of cavities through the reinforcing member 2 formed by cooperating the plurality of reinforcing plates. In this embodiment, four reinforcing plates are provided, and a cross section of the reinforcing member 2 is cross-shaped; and a bottom end of the reinforcing member 2 extends to the bottom of the inner wall of the tank body 1, and the inner cavity of the tank body 1 is divided into four cavities.

The tank body includes a preforming layer 12 and an outer winding layer 13 covered on an outer surface of the preforming layer 12. The preforming layer 12 includes a first preforming layer 121 and a second preforming layer 122, the second preforming layer 122 is adhered to an inner surface of the outer winding layer 13, an end part of the reinforcing member 2 is fixedly connected to the second preforming layer 122 so that the inner cavity of the tank body 1 is formed into the above four cavities, and the first preforming layer 121 adhered to the second preforming layer 122 and the reinforcing member 2 is arranged in the cavities.

When the first preforming layer 121 extends to the reinforcing member 2 at the two ends of the second preforming layer 122, an arc corner is formed. Due to this arc corner, a gap is formed among the first preforming layer 121, the second preforming layer 122 and the reinforcing member 2, and carbon-fibre filling yarns 14 are filled in the gap.

A plurality of reinforcing rings 15 are arranged on the inner wall of the tank body 1 along a circumferential direction. In this embodiment, four reinforcing rings 15 are provided, each reinforcing ring 15 is divided into four sections, and each section is arranged on the inner walls of the four cavities and located on the inner surface of the first preforming layer 121 in respective.

A metal gas guide tube 3 is embedded at a position where the tank body 1 is located at the gas guide port 11 for air intake and exhaust, an embedding portion 31 is arranged at the bottom of the metal gas guide tube 3, the gas guide port 11 of the tank body 1 is provided with an embedding groove for inserting the embedding portion 31 between the first preforming layer 121 and the second preforming layer 122, and an outer winding layer 13 extends to an outer surface of the metal gas guide tube 3.

A sealing pad 5 is filled between the metal gas guide tube 3 at the corner and the second preforming layer 122, the sealing pad 5 is made of rubber, the metal gas guide tube 3 is provided with a plurality of depression portions 32 outside the front end of the corner, and protrusion portions 131 corresponding to the depression portions 32 are arranged on the inner wall of the outer winding layer 13, thereby enhancing the sealing performance of the tank body and the metal gas guide tube.

The first preforming layer 121, the second preforming layer 122, the outer winding layer 13 and the reinforcing member 2 of the tank body 1 are all made of the carbon-fiber composite, and the fibre in each layer is dense and smooth, thereby improving the product strength.

A manufacturing process for a carbon-fibre composite high-pressure hydrogen storage tank, including the following steps of:

S1: processing and curing a reinforcing member 2 for improving the strength of a tank body, and forming four cavity preforming grooves 21 on the reinforcing member 2;

S2: filling high-pressure air in a silicon air pocket 4 and maintaining the pressure continuously, so that the silicon air pocket 4 expands and its surface is subjected to the primary yarn covering by adopting the carbon-fibre composite to form a first preforming layer 121, thereby manufacturing cavity preforming members of the tank body 1; and the silicon air pocket 4 being transversely provided with a groove on an outer surface of each cavity preforming member, and the first preforming layer 121 extending in the groove to form a reinforcing ring 15;

S3: combining and preforming four cavity preforming members manufactured in S2 to cavity preforming grooves 21 of the reinforcing member 2 in S1, so as to form tank body preforming members; and filling carbon-fibre filling yarns 14 in a combination gap between the reinforcing member 2 and the cavity preforming members;

S4: performing a secondary yarn covering on the surface of the tank body preforming member manufactured in S3 by adopting the carbon-fibre composite, so as to form a second preforming layer 122; and embedding a metal gas guide tube 3 at a gas guide port 11 of the tank body preforming member and between the first performing layer 121 and the second preforming layer 122, and filling a sealing pad 5 between the metal gas guide tube 3 at the corner and the second preforming layer 122;

S5: cooling the tank body preforming member with the secondary yarn covering in S4 to a room temperature after being baked and cured, winding a surface of the second preforming layer 122 by adopting the carbon-fibre composite so as to form an outer winding layer 13, and the outer winding layer 13 extending to an outer surface of the metal gas guide tube 3, wherein the metal gas guide tube 3 is provided with a plurality of depression portions 32 outside the front end of the corner, and protrusion portions 131 corresponding to the depression portions 32 are arranged on the inner wall of the outer winding layer 13; and S6: cooling the tank body preforming members wound in S5 to a room temperature after being baked and cured, releasing the gas in the silicon air pocket 4 and taking out the silicon air pocket 4, and trimming and processing the prepared tank body 1, so as to form a hydrogen storage tank product.

In conclusion, the above is a preferred implementation mode of the present disclosure, but the scope of protection of the present disclosure is not limited to this. Those skilled in the art can easily think of changes or replacements within the scope of the technology disclosed in the present disclosure, which shall be covered by the scope of protection of the present disclosure. Therefore, the scope of protection of the present disclosure should be subject to the scope of protection of the appended claims.

What is claimed is:

1. A carbon-fibre composite high-pressure hydrogen storage tank, comprising a tank body, wherein a gas guide port is formed in one side of the tank body, a reinforcing member for improving the strength of the tank body is arranged in an inner cavity of the tank body, a side end of the reinforcing member is fixedly connected to an inner wall of the tank body, and the tank body and the reinforcing member are all made of carbon-fibre composite.

2. The carbon-fibre composite high-pressure hydrogen storage tank according to claim 1, wherein the reinforcing member comprises a plurality of reinforcing plates, which are cooperated with each other and integrally formed with the tank body.

3. The carbon-fibre composite high-pressure hydrogen storage tank according to claim 2, wherein four reinforcing plates are provided, and a cross section of the reinforcing member is cross-shaped.

4. The carbon-fibre composite high-pressure hydrogen storage tank according to claim 2, wherein a bottom end of the reinforcing member extends to the bottom of the inner wall of the tank body.

5. The carbon-fibre composite high-pressure hydrogen storage tank according to claim 1, wherein the tank body comprises a preforming layer and an outer winding layer covered on an outer surface of the preforming layer.

6. The carbon-fibre composite high-pressure hydrogen storage tank according to claim 5, wherein the preforming layer comprises a first preforming layer and a second preforming layer, the second preforming layer is adhered to an inner surface of the outer winding layer, an end part of the reinforcing member is fixedly connected to the second preforming layer so that the inner cavity of the tank body is divided into a plurality of cavities, and the first preforming layer adhered to the second preforming layer and the reinforcing member is arranged in the cavities.

7. The carbon-fibre composite high-pressure hydrogen storage tank according to claim 1, wherein a plurality of reinforcing rings are arranged on the inner wall of the tank body along a circumferential direction.

8. The carbon-fibre composite high-pressure hydrogen storage tank according to claim 1, wherein a metal gas guide tube is embedded at a position where the tank body is located at a gas guide port.

9. The carbon-fibre composite high-pressure hydrogen storage tank according to claim 8, wherein a sealing pad is filled between the metal gas guide tube at a corner and the tank body.

10. The carbon-fibre composite high-pressure hydrogen storage tank according to claim 9, wherein a plurality of depression portions are arranged at a position where an outer side of the metal gas guide tube is located at a front end of the corner, and protrusion portions corresponding to the depression portions are arranged on the inner wall of the tank body.

11. A manufacturing process for the carbon-fibre composite high-pressure hydrogen storage tank comprising the following steps of:
S1: processing and curing a reinforcing member for improving the strength of a tank body, and forming a plurality of cavity preforming grooves on the reinforcing member;
S2: filling high-pressure air in a silicon air pocket and maintaining the pressure continuously, so that the silicon air pocket expands and its surface is subjected to the primary yarn covering by adopting the carbon-fibre composite to form a first preforming layer, thereby manufacturing cavity preforming members of the tank body;
S3: combining and preforming a plurality of cavity preforming members manufactured in S2 to cavity preforming grooves of the reinforcing member in S1, so as to form tank body preforming members;
S4: performing a secondary yarn covering on the surfaces of the tank body preforming members manufactured in S3 by adopting the carbon-fibre composite, so as to form a second preforming layer; and embedding a metal gas guide tube at a gas guide port of each tank body preforming member and between the first preforming layer and the second preforming layer;
S5: cooling the tank body preforming members with the secondary yarn covering in S4 to a room temperature after being baked and cured, winding a surface of the second preforming layer by adopting the carbon-fibre composite so as to form an outer winding layer, and the outer winding layer extending to an outer surface of the metal gas guide tube; and
S6: cooling the tank body preforming members wound in S5 to a room temperature after being baked and cured, releasing the gas in the silicon air pocket and taking out the silicon air pocket, and trimming and processing the prepared tank body.

12. The manufacturing process for the carbon-fibre composite high-pressure hydrogen storage tank according to claim 11, wherein in S2, the silicon air pocket is transversely provided with a groove on an outer surface of the cavity preforming member, and the first preforming layer extends in the groove to form a reinforcing ring.

13. The manufacturing process for the carbon-fibre composite high-pressure hydrogen storage tank according to claim 11, wherein in S4, a sealing pad is filled between the metal gas guide tube at the corner and the second preforming layer.

14. The manufacturing process for the carbon-fibre composite high-pressure hydrogen storage tank according to claim 11, wherein in S5, a plurality of depression portions are arranged at a position where the metal gas guide tube is located at a front end of the corner, and protrusion portions corresponding to the depression portions are arranged on the inner wall of the outer winding layer.

* * * * *